United States Patent
Williams et al.

(10) Patent No.: US 9,810,777 B2
(45) Date of Patent: Nov. 7, 2017

(54) ASYNCHRONOUS LADAR AND IMAGING ARRAY

(71) Applicant: Voxtel, inc., Beaverton, OR (US)

(72) Inventors: George Williams, Portland, OR (US); Adam Lee, Portland, OR (US)

(73) Assignee: Voxtel, Inc., Beaverton, OR (US)

( * ) Notice: Subject to any disclaimer, the term of this patent is extended or adjusted under 35 U.S.C. 154(b) by 350 days.

(21) Appl. No.: 14/548,172

(22) Filed: Nov. 19, 2014

(65) Prior Publication Data

US 2016/0054434 A1 Feb. 25, 2016

Related U.S. Application Data

(63) Continuation-in-part of application No. 14/526,340, filed on Oct. 28, 2014.

(60) Provisional application No. 62/040,623, filed on Aug. 22, 2014, provisional application No. 62/065,508, filed on Oct. 17, 2014.

(51) Int. Cl.
*G01S 7/486* (2006.01)
*G01S 17/89* (2006.01)
*G01S 17/10* (2006.01)
*G01S 17/02* (2006.01)

(52) U.S. Cl.
CPC .......... *G01S 7/4865* (2013.01); *G01S 7/4863* (2013.01); *G01S 17/023* (2013.01); *G01S 17/10* (2013.01); *G01S 17/89* (2013.01)

(58) Field of Classification Search
CPC .... G01S 7/4865; G01S 17/023; G01S 7/4863; G01S 17/10; G01S 17/89
See application file for complete search history.

(56) References Cited

U.S. PATENT DOCUMENTS 8,581,168 B2 11/2013 Linder
2012/0261553 A1 10/2012 Elkind

*Primary Examiner* — Twyler Haskins
*Assistant Examiner* — Angel L Garces-Rivera

(57) ABSTRACT

An imaging device comprises of a pixelated array of semiconductor detector elements, in which each detecting element is electrically connected to an integrated circuit, the integrated circuit of each of the pixels comprising a passive signal path and a transient signal path. The passive path provides consecutive frame or scene imaging and the transient path detects the transient electromagnetic events such as laser pulses. The transient path is electrically connected to a timing circuit, the timing circuit for determining the time-of-flight of return pulses emitted from the electromagnetic source detected by the transient signal paths. Wherein the passive path and transient path operate simultaneously enabling simultaneous passive and LADAR imaging.

34 Claims, 11 Drawing Sheets

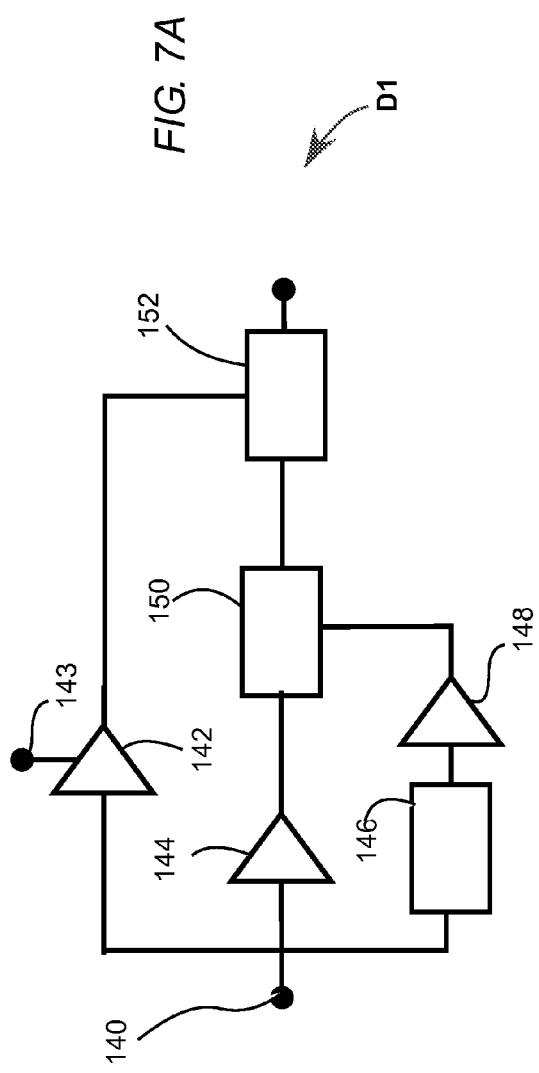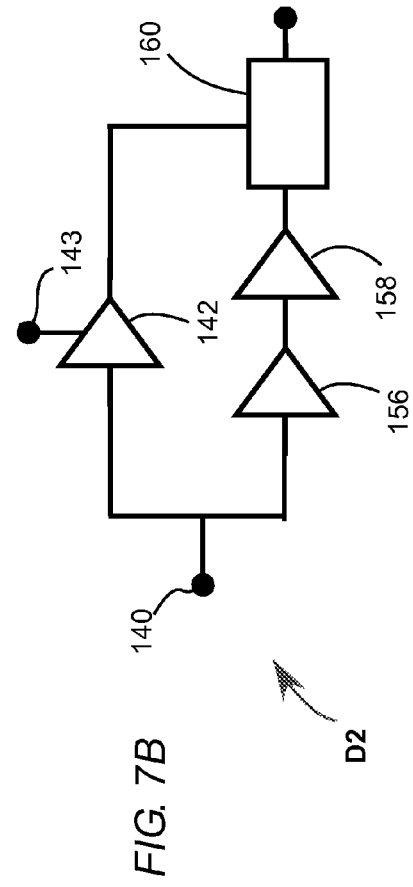

ASYNCHRONOUS LADAR AND IMAGING ARRAY

REFERENCE TO RELATED APPLICATIONS

This application is a continuation-in-part of U.S. patent application Ser. No. 14/526,340, filed on Oct. 28, 2014, which claimed priority of U.S. Provisional Application No. 62/040,623, filed on Aug. 22, 2014, and U.S. Provisional Application No. 62/065,508 filed on Oct. 17, 2014.

TECHNICAL FIELD OF THE DISCLOSURE

The present disclosure relates in general to LADAR (also referred to as LIDAR) and imaging devices. The disclosure relates in particular to semiconductor imaging devices capable of capturing both image and range information.

DISCUSSION OF BACKGROUND ART

In a semiconductor based imager, an array of pixels each comprise of a photosensitive junction or photodetector. When a photon with sufficient energy is incident upon and absorbed in the structure an electron-hole pair is created. To read resultant current from absorbed photons an amplifier is required. In CMOS devices an active pixel sensor (APS) has an integrated circuit for each pixel in the sensor with the photosensitive junction and amplifier built within the same material. In ultraviolet and infrared devices a readout integrated circuit (ROIC) is commonly used, where the photodetector and ROIC are made on different materials, then bonded. In order to achieve dual mode functionality within a pixel, such as classic frame rate imaging and high frequency events, advanced APS or ROIC designs must be implemented.

One such apparatus is described in U.S. Publication [US 20120261553 A1] wherein an ROIC is provided which allows for switching between different detection modes. One of the disclosed modes allows detection of a thermal scene imagery and detection of a short laser pulse in a commonly shared readout path. Another mode allows LADAR detection with a timing circuit at the exclusion of the other modes.

Another apparatus is described in U.S. Pat. No. 6,864,965 wherein a monolithic dual mode array allows switching between a passive scene imagery mode and a LADAR detection mode. Switching between modes is enabled by changing the bias on pixels of the array.

This application relates to another approach.

SUMMARY OF THE DISCLOSURE

The present disclosure is directed to dual-mode imaging devices. In one aspect, an imaging device in accordance with the present disclosure comprises of a pixelated array of semiconductor detector elements, in which each detecting element is electrically connected to an integrated circuit, the integrated circuit of each of the pixels comprising a passive signal path and a transient signal path. The passive path provides consecutive frame or scene imaging and the transient path detects the transient electromagnetic events such as laser pulses. The transient path is electrically connected to a timing circuit. In one embodiment the timing circuit has a time-to-analog converter, the time-to-analog converter providing an analog-time-signature (ATS) for determining the time-of-flight of return pulses emitted from the electromagnetic source detected by the transient signal paths. Wherein the passive path and transient path operate simultaneously enabling simultaneous passive and LADAR imaging.

BRIEF DESCRIPTION OF THE DRAWINGS

The accompanying drawings, which are incorporated in and constitute a part of the specification, illustrate preferred embodiments of the present disclosure. The drawings together with the general description given above and the detailed description of preferred methods and embodiment given below, serve to explain principles of the present disclosure.

FIG. 7A is an electrical diagram of a constant fraction discriminator.

FIG. 7B is an electrical diagram of a zero crossing discriminator.

DETAILED DESCRIPTION OF THE DISCLOSURE

Figure 1:
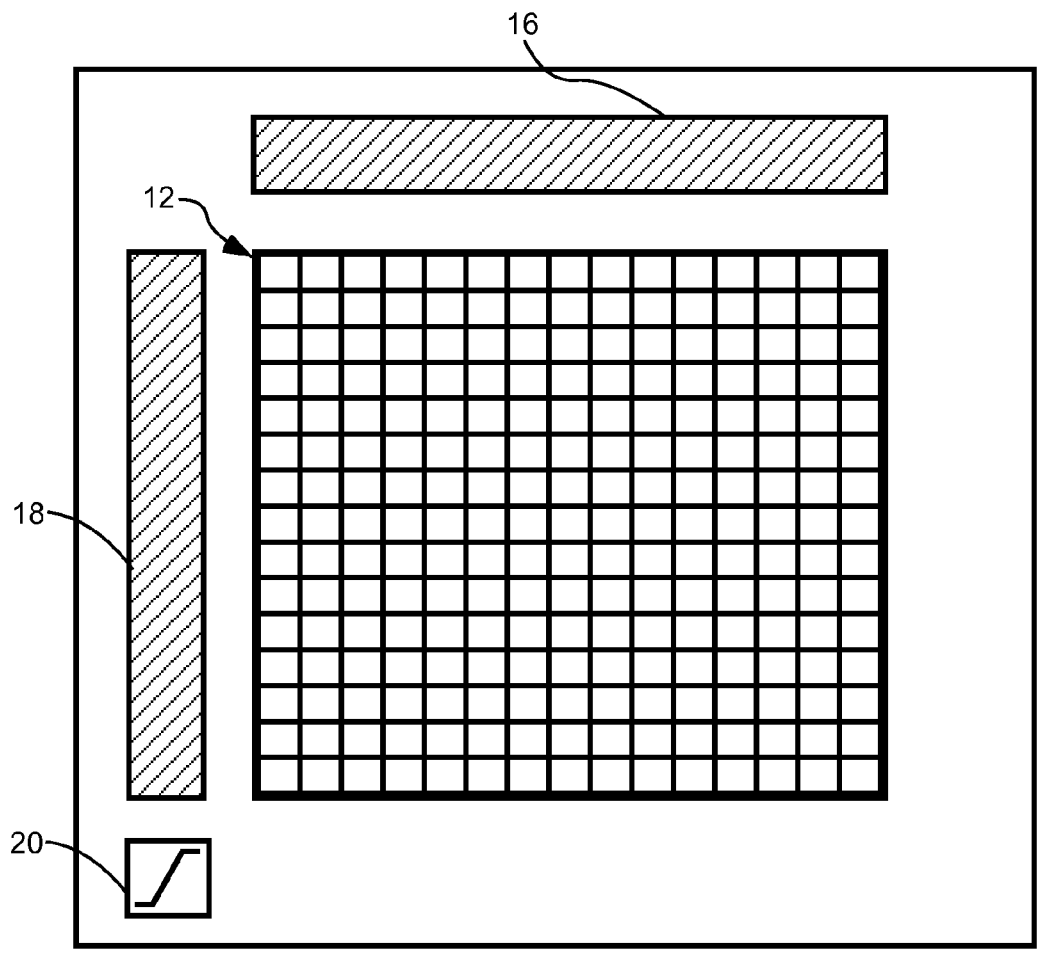
FIG. 1 is a plan view, schematically illustrating an imaging device of the present disclosure, the device comprises of a pixelated array of semiconductor detector elements, wherein each detecting element is electrically connected to an integrated circuit, the integrated circuit comprising a passive signal path and a transient signal path, the transient signal path electrically connect to a timing circuit, wherein the timing circuit has a time-to-analog converter, the time-to-analog converter providing an analog-time-signature for determining the time-of-flight of pulses emitted from an electromagnetic source.

Referring now to the drawings, wherein like components are designated by like reference numerals. Methods and embodiments of the present disclosure are described further hereinbelow.

FIG. 1 schematically illustrates a dual-mode imaging device 10A.

Device 10A comprises of a pixelated array 12 of semiconductor detector elements. Each pixel individually is electrically connected to an integrated circuit. The integrated circuit comprises of a passive and a transient path. The passive path allows passive imaging of scene data and the transient path operates simultaneously to allow detection of transient electromagnetic events such as laser pulses. The transient paths are electrically connected to a timing circuit. Here the timing circuit has a time-to-analog converter 20. Time-to-analog converter 20 provides an analog-time-signature and allows time-of-flight determination of pulses emitted from an electromagnetic source and detected by the transient signal path. The time-to-analog converter can be implemented to service all the pixels, as shown, or a separate time-to-analog converter can service each row or be integrated within each pixel.

Here, the passive path and the transient path are operated by a readout decoder block, although other readout routines can be implemented as described further hereinbelow. The readout decoder block comprises of a row decoder 18 and a column decoder 16. The readout decoder block has an output port where data is output. The output port may be an analog output or may include an analog-to-digital converter, whereby parallel or serial digital data is output from the port. The readout decoder block is capable of typical readout speeds in the megahertz (MHz), for example the readout decoder block can operate at about 20 MHz, the readout of the entire array dependent upon the pixelated array size. Here the pixelated array is shown as a 15 by 15 array for illustrative purposes only. The pixelated array, the electromagnetic source, circuitry details of the passive and the transient signal and variations of those are discussed further hereinbelow.

Pixelated array 12 is made from a photosensitive semiconductor material referred herein as photodetector material. The photodetector can be made from any photosensitive semiconductor material which can be pixelated. Non-limiting examples of photosensitive semiconductor material include germanium (Ge), indium gallium arsenide (InGaAs), indium antimode (InSb), indium phosphide (InP), mercury cadmium telluride (HgCdTe), silicon (Si), group III-V, II-VI super lattice, quantum well detector, or any combinations thereof. Each semiconductor type has spectral response which allows detection at various spectral bands from x-ray to infrared. Spectral response of the photodetector materials can be extended or modified by implementation coating and scintillators. Coating include antireflection coating, reflection coating, bandpass, bandstop, shortpass, longpass, notch, and other such spectral filtering and combinations thereof. Scintillators allow up-converting or down-converting of otherwise undetectable wavelengths to wavelengths detectable to the particular photodetector material.

One preferred photodetector material is indium gallium arsenide (InGaAs) with spectral sensitivity from about 900 nanometers (nm) to about 1700 nm. Utilizing InGaAs allows for passive imaging in the near infrared region for low light imaging and allows detection of NIR laser such as neodymium-doped yttrium aluminum garnet (Nd:YAG) at 1064 nm or Er:Glass laser at 1535 nm, or any laser that emits in the NIR, including the so called "eyesafe" spectral ranges longer than 1300 nm, where the radiation is less of an ocular hazard. Removal of the InP substrate supporting the InGaAs detector materials allows extended spectral sensitivity down to 500 nm and below.

When the photodetector material is made from ultraviolet, near-infrared, or infrared sensitive semiconductor material, other than silicon, a separate readout integrated circuit (ROIC) must be manufactured and attached to the pixel array using such methods as solder bump bond hybridization. If the photodetector material is silicon, then the circuit can be integrated within the silicon, referred generally as active pixel sensors (APS), although silicon based devices can also use a separate integrated circuit. The ROIC or the APS can be manufactured with well-known silicon based photolithography techniques such as those developed in CMOS technology. Additionally the circuitry can be manufactured via 3D electronics packaging techniques such as edge-wiring or vertically stacking chips with through-silicon via (TSV).

Other methods to increase spectral performance of the device, in addition to the aforementioned material types, coating, and scintillators, is based on the material thickness. The thickness of the photodetector material will have an effect on the spectral range of the imaging device based on the photodetector absorption length. Back thinning or wafer removal techniques allow for increased spectral response for materials which have a short absorption length in the desired spectral range. Alternatively, thick substrates are desirable when the absorption length of the photodetector material is long.

Additional techniques to increase performance of the device is reduction of noise. Cooling decreases dark current of the photodetector material. Cooling can be achieved by heat exchangers such as fins, fans, thermoelectric coolers (TEC), coolant pumping, or reservoirs carrying colds liquids, such as a liquid nitrogen dewar. For instance, when InGaAs photodetector material is used with thermoelectric cooling (TEC), or other equivalent cooling methods, dark current noise is decreased by about half with every 7° of cooling.

The electromagnetic source can be any source capable of emitting pulses of electromagnetic energy. A preferred source type is a laser. The laser can be gas, chemical, dye, metal-vapor, solid-state, semiconductor, or fiber based. The type of source depend on particulars of the application. Considerations for source choice include the devices desired size and weight, the sources wavelength, temporal frequency, energy, pulse width, the spectral sensitivity of the array, spectral properties of objects and the surrounding environment, and the distance to and size of those objects to be observed.

A preferred application for the present disclosure is simultaneous passive and flash-LADAR imaging. For flash-LADAR the scene to be imaged must be fully illuminated by the electromagnetic source. For sources which are collimated or otherwise have low divergence, beamshaping optics are preferably employed. Beam shaping optics can be lens, mirrors, diffuser, diffractive, any other such optic capable altering the propagation of electromagnetic radiation. The beamshaping optics can be stationary, or mechanically or electrically actuated. A simple implementation example is a diffuser placed in front of the source and scatters light. A more advanced implementation example, when using a coherent source, is a beam splitting diffractive optic which preferably splits the beam such that each diffractive order corresponds with a pixel of the pixelated array.

Figure 2:
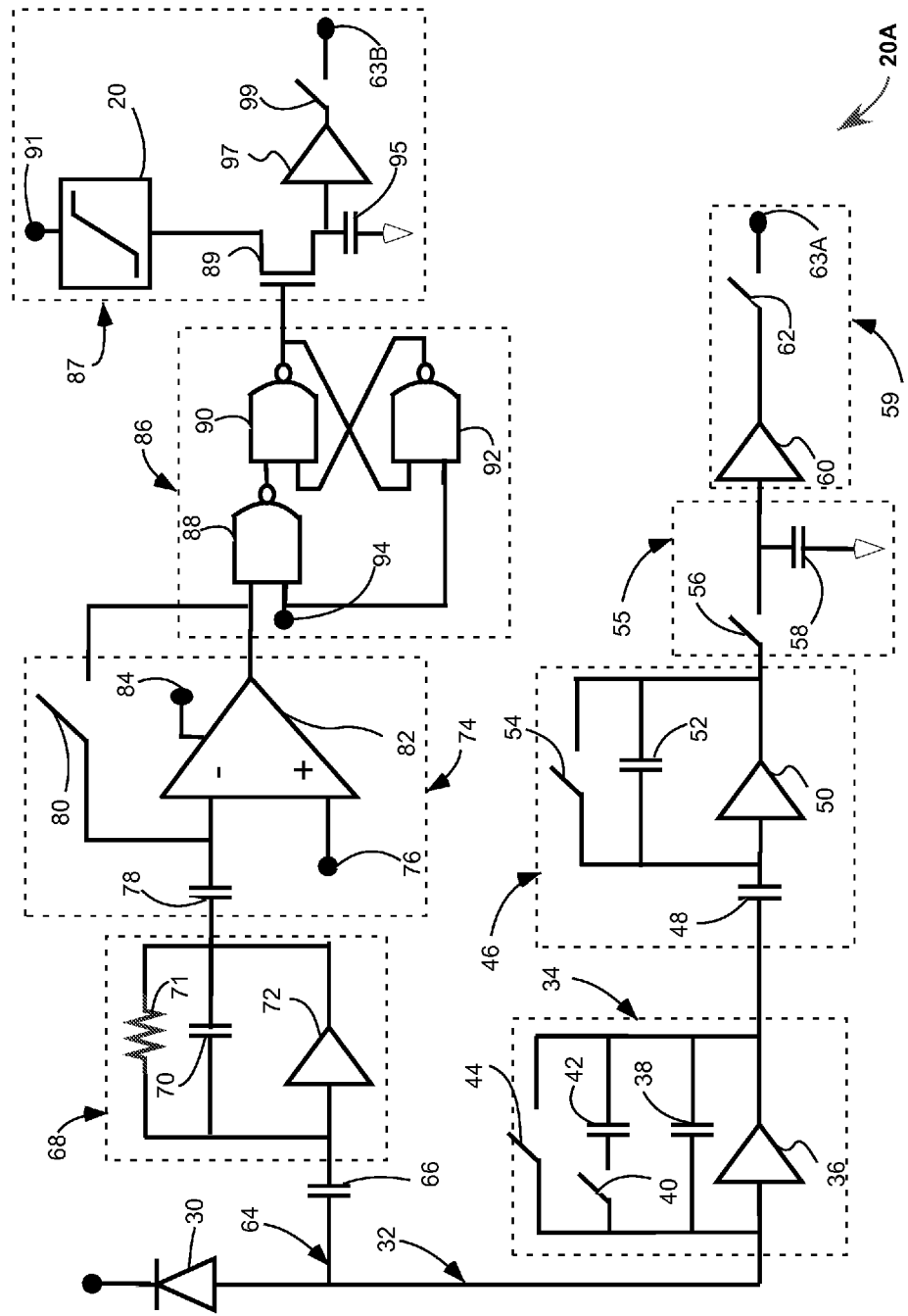
FIG. 2 is an electrical diagram of the integrated circuit of a pixel of the pixel array of that shown in FIG. 1.

FIG. 2 is an electrical diagram of an integrated circuit 20A of the present disclosure. Here, one of the photosensitive pixels in the pixel array is represented by a photodiode 30. The direct current and slow current changes are detected by the passive path and fast current changes are detected through the active path. By way of example, during operation, photodiode 30 is illuminated by scene imagery and provides relatively slow current flowing through a passive path 32.

Passive path 32 has a slow charge integrator 34, a noise reduction circuit 46, a sampling circuit 55 and a readout circuit 59. Here, the slow charge integrator is a capacitor transimpedance amplifier (CTIA), although other designs could be implemented such as resistive transimpedance amplifier (RTIA), source follower per detector (SFD) or direct injection (DI). Here, CTIA 34 consists of an amplifier 36, in parallel with; a capacitor 38, a switch 40 in series with a capacitor 42, and a reset switch 44. Switch 40 allows increased capacitance in parallel with amplifier 36, thereby decreasing gain of the amplifier and increasing the well capacity of the pixel. CTIA 34 is sufficiently fast to respond to and provide passive imagery but slow enough not to react to fast current changes such as those induced by a laser pulses incident on the photodiode.

Noise reduction circuit 46 employs correlated double sampling (CDS). Noise reduction circuit 46 has capacitor 48 in series with the following parallel components: a amplifier 50, a capacitor 52 and a switch 54. Sampling circuit 55 has switch 56 and hold capacitor 58. Closing switch 56 passes the noise reduction stage 46 output to hold capacitor 58. Opening switch 56 isolates the signal on a hold capacitor 58 from the rest of the circuit. Readout circuitry 59 has a buffer 60, and a switch 62. The readout circuit delivers the signal to a column wire 63B when passive signal select switch 62 is closed via clocking signals sent from the row readout decoder block Here, the readout routine is standard raster scan readout of the passive path, as will be described operationally further hereinbelow. The particular CDS shown is exemplary of an active CDS, but passive CDS can be implemented without departing from the present disclosure. Likewise either integrate then read (ITR) or integrate while read (IWR) routines can be implemented.

A transient signal path 64 has an AC coupling capacitor 66, a continuous reset CTIA circuit 68, a discriminator 74, a latch circuit 86, and a timing circuit 87. Coupling capacitor 66 prevents slow changing current to pass, yet allows fast current changes to pass, such as those induced by laser pulses. A continuous reset circuit 68 has a capacitor 70, a resistor 71, and an amplifier 72.

A discriminator 74 has a capacitor 78, a switch 80, an amplifier 82, a calibration input 84 and a voltage threshold 76. Voltage threshold 76 is a user input which can be changed according to the expected pulse event strength and noise of the system. The voltage threshold is preferably above the noise floor, thereby preventing false triggers and low enough to trigger and detect laser pulses incident on photodiode 30. Switch 80 and calibration input 84 are used to calibrate the discriminator, measuring and applying the amplifier offset across capacitor 78. When an event occurs above the calibrated threshold amplifier 82 provides digital output to latch circuit 86.

Latch circuit 86 receives the digital output from the discriminator and latches to indicate a laser event. Latch circuit has a NAND gate 88 with output to a NAND gate 90. NAND gate 90 and a NAND gate 92 are configured in a cross-coupled configuration resulting in a set-reset latch operation. A reset signal 94 is provided by the column arbitration and provides a signal to both NAND gate 88 and NAND gate 92 allowing reset of the latch circuit, independent of the discriminator output. When a laser event occurs the latch circuit holds thereby flagging timing circuit 87.

Timing circuit 87 is electrically connected with latch circuit 86. Timing circuit 87 has time-to-analog generator 20, a sample switch 89, a sample capacitor 95, a buffer 97, and a transient path select switch 99. Before detection of the return pulse, time-to-analog controller 20 receives a time-base reference at input 91, which temporally corresponds to the emission of the now detected return pulse. The time-base reference is used for calculating the time-of-flight of returned pulses. Concurrent with, or at some finite delay from, the reception of the time-base reference, the time-to-analog controller initiates an analog-time-signature. The analog-time-signature is a rising, falling, or oscillating temporal voltage function. The value of the temporal voltage function corresponds with the time-of-flight of the return pulse. The signal from the latch circuit opens switch 89 and allows the value of the analog-time-signature to be held onto time hold capacitor 95. Readout of the time hold capacitor 95 is similar to the passive signal path with buffer 97 and transient path switch 62 which allow readout at a node 63 based on aforementioned row and column readout.

The combination of the transient path and the passive path allows simultaneous passive and LADAR imaging. The readout decoder block continually rasters reading out either the passive path or the active path. Readout of either path can be performed in whole, row by row, or pixel by pixel, switching readout between paths in any predetermined numerical intervals so as to correlate the received data. With collection of the two sets of data, the passive imagery and LADAR data can be overlaid on a display, represented three dimensionally or otherwise logically correspond in output data.

Figure 3:
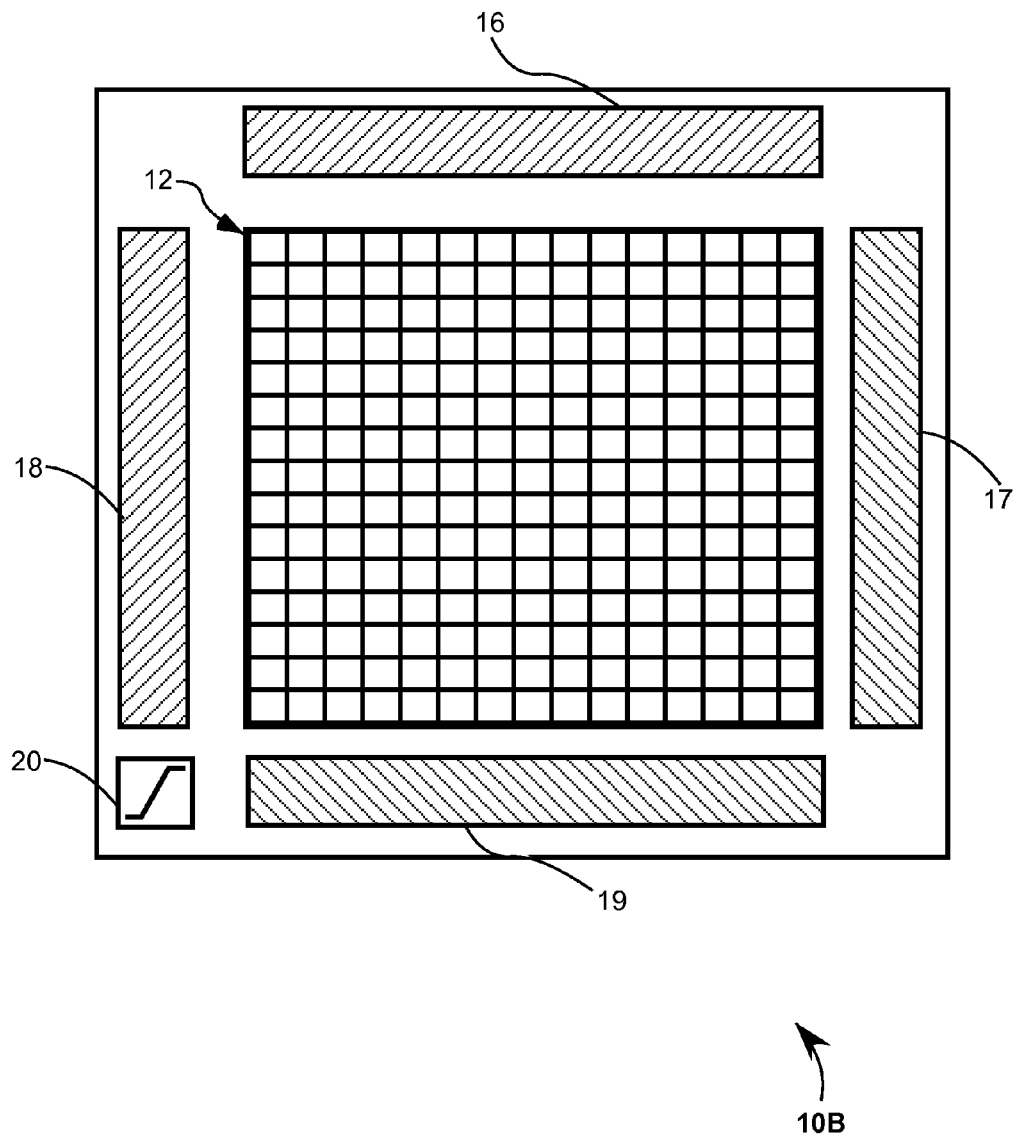
FIG. 3 is a plan view of the dual mode imaging device as that seen in FIG. 1, with separate readout of the passive path and transient path.

Optionally a second readout decoder block can be implemented to increase readout speed. A second readout decoder block can be dedicated to the transient path to allow asynchronous readout of the passive path and transient path. FIG. 3 is a plan view of a device 10B showing that of device 10A of FIG. 1 with the addition of a second decoder block. The second decoder block has a transient row decoder 17, and a transient column decoder 19 operating identically to the decoders described in FIG. 1, except the second readout decoder block reads out the transient path and the first readout decoder block reads out the passive path.

Figure 4A:
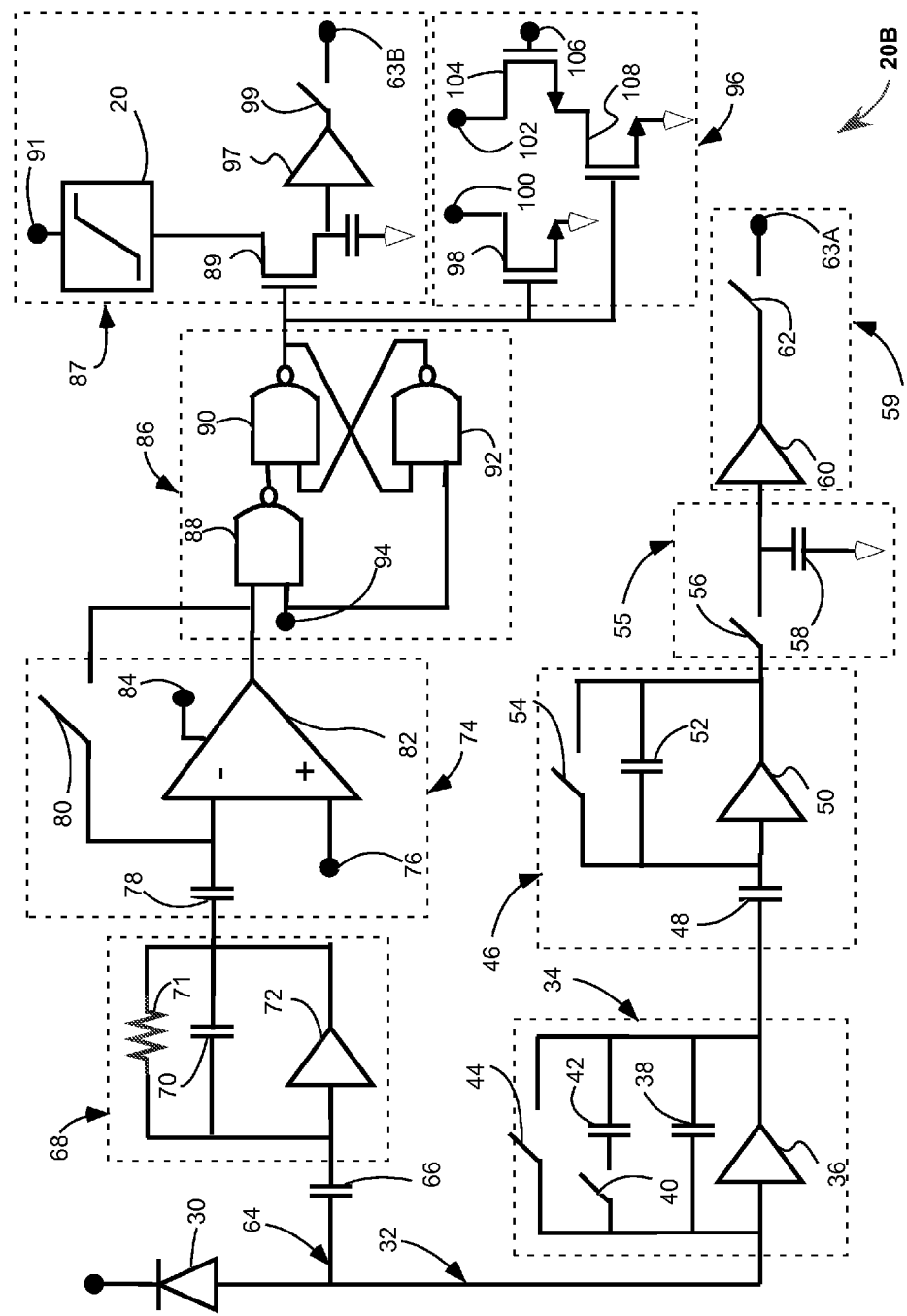
FIG. 4A is an electrical diagram of the integrated circuit of a pixel with address arbitration of the transient signal path.

FIG. 4A is an electrical diagram of an pixel integrated circuit 20B. Integrated circuit 20B has that shown in FIG. 2 with the addition of a digital flag readout logic circuit 96. The readout logic circuitry, in conjunction with an address arbitration readout block, enables asynchronous address detection and readout of pixel detecting transient signals. The address arbitration readout block comprises of a row arbiter and a column arbiter. Unlike the readout decoder blocks, the address arbitration block is event driven.

Here the passive path of integrated circuit 20B operates as the passive path of integrated circuit 20A of FIG. 2. Likewise the transient path operates substantially similar, except latch circuitry 86 provides a latched digital signal to both timing circuit 87 and digital flag readout logic circuit 96. Digital flag readout logic circuit 96 has a row request 100 and column request 102. Row request 100, an open drain circuit, is flagged by closing a transistor logic 98. A column request 102, another open drain circuit, is flagged by closing a transistor logic 104 and a transistor logic 108. The hold signal from the latch closes transistor logic 98 thereby flagging row request 100. Flagging row request 100 provides temporal information of the event. When the row arbitrator sees the flagged row request it performs a row read 106 which closes transistor logic 104, thereby flagging for a column flag readout. After the row readout and column readout the location of the pixel is known.

Figure 4B:
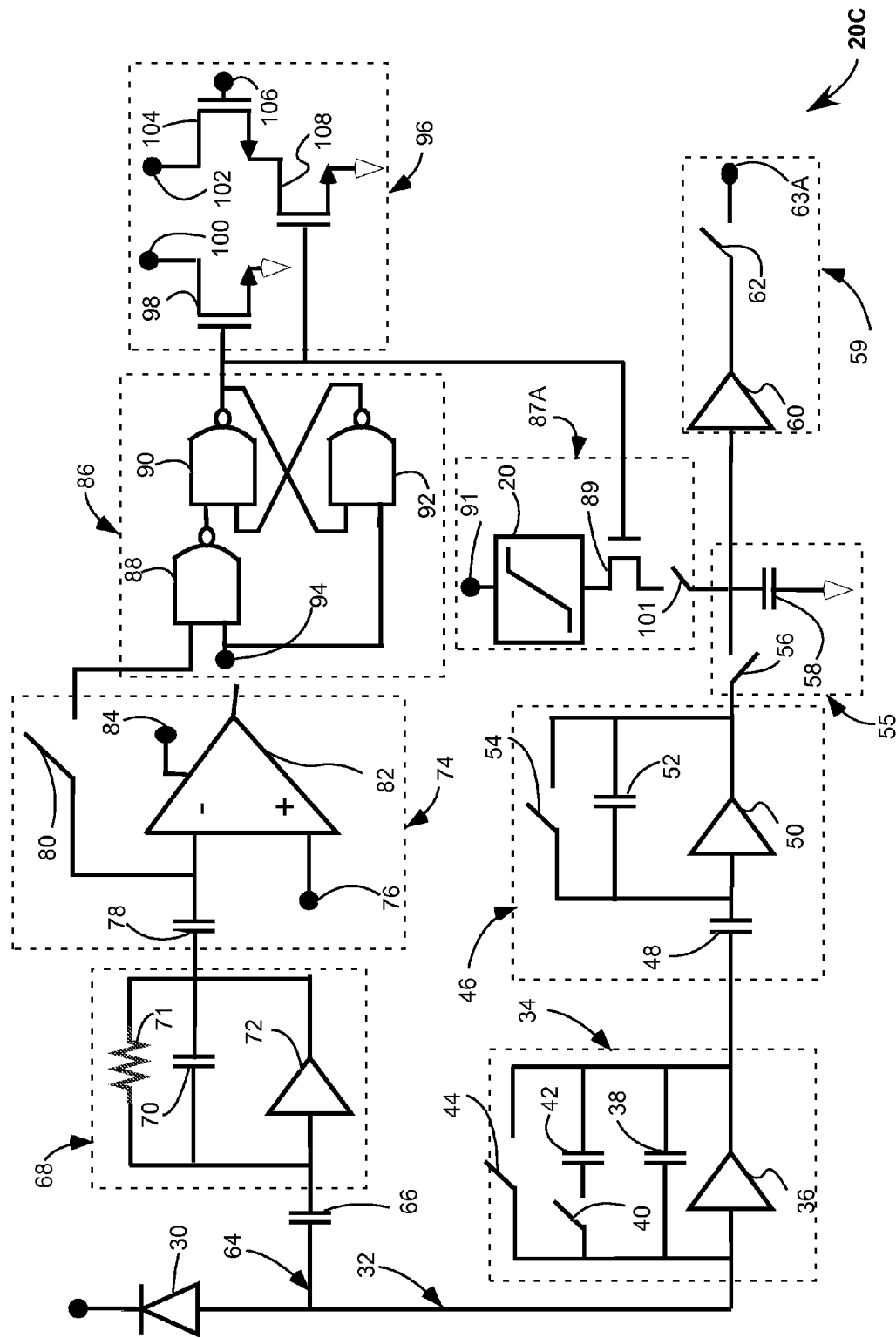
FIG. 4B is an electrical diagram of the integrated circuit of a pixel with address arbitration in the transient signal path and the timing circuit electrically connected to the passive signal path.

FIG. 4B is an electrical diagram of pixel integrated circuit 20C.

Integrated circuit 20C has that shown in FIG. 4A, except here, a timing circuit 87A is connected to the passive signal path instead of the transient path, such that the passive path sampling circuit 55 and readout buffer 59 are used for readout of the timing circuit. Here, timing circuit 87A has time-to-analog generator 20, switch 89, and a switch 101, the timing circuit requires less components as some are provided by the sampling and readout circuit of the passive signal path. To enable passive imaging, switch 101 of timing circuit 87A is opened and operation. Switch 101 isolates the timing circuit from the passive signal path and operation of the passive signal path is the same as described above. To enable readout of a timing circuit switch 56 is opened, isolating the passive path circuitry from the sampling circuit hold capacitor 58 and readout circuit 59. Switch 101 is closed electrically connecting the timing circuit to hold capacitor 56 and readout circuit 59. Operation of the timing circuit is thus enabled and operation is substantially the same as described above, wherein timing circuit 87A, capacitor 58, and readout circuit 59 comprise the same components as timing circuit 87 of FIG. 4A.

Figure 5:
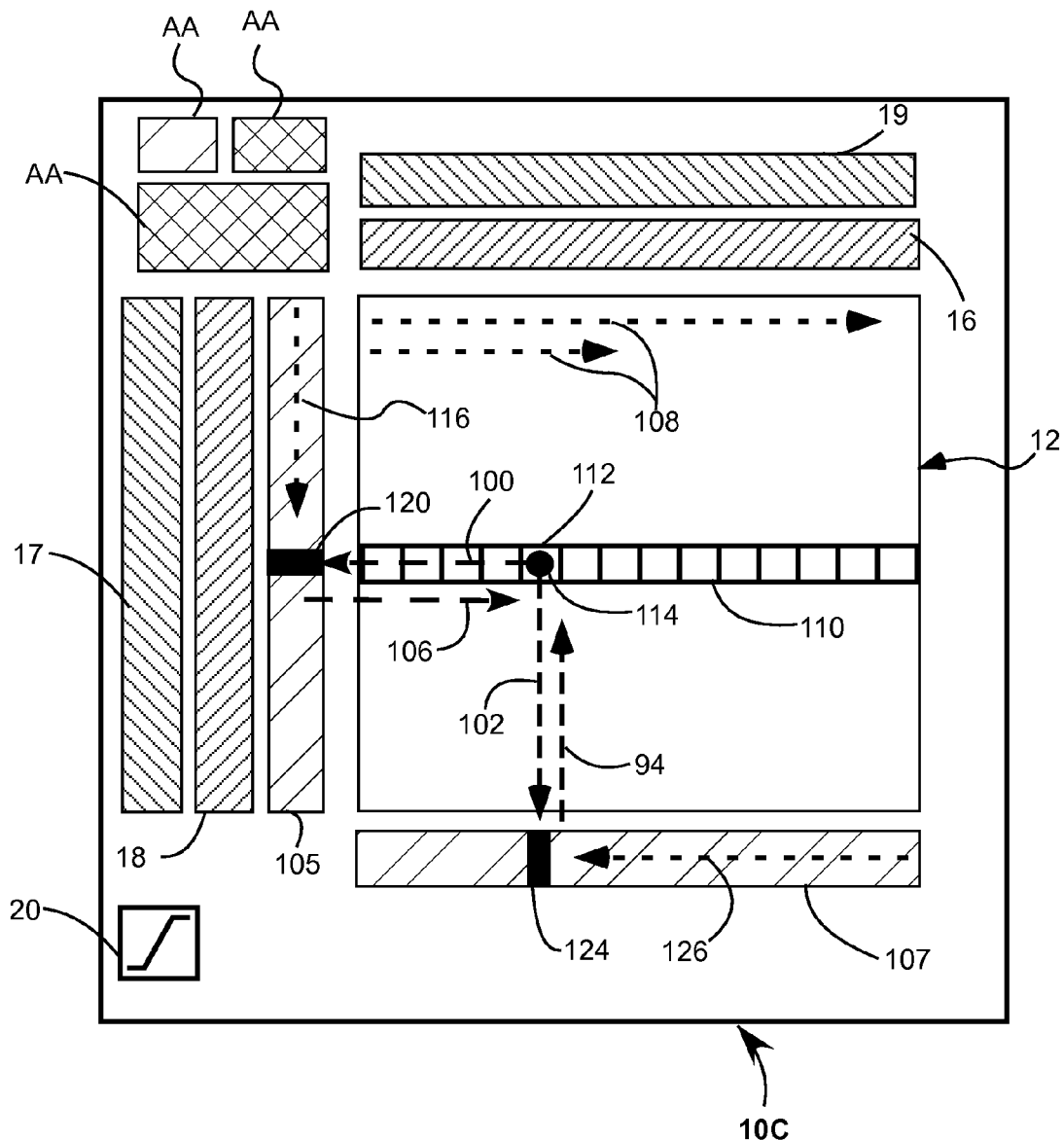
FIG. 5 is a plan view of the imaging device, schematically illustrating address readout of pixels, wherein an address arbitration control block and optional dedicated readout control block is provided.

FIG. 5 is a plan view of an imaging device 10C wherein a single row is illustrated for purposes of explaining the passive readout via the readout decoder block and transient path readout via the address arbitration control block. During operation row decoder 18 and column decoder 16 read out rows of pixels in a raster pattern 108. Timing of the raster readout is clocked by activating a row, then sequentially activating the column, reading each pixel individually. While the row and column decoder are reading out the passive signals or the passive path is integrating, a row arbitrator 105 is awaiting a flagged row request. At any point during passive imaging a returned laser pulse or other detected transient signal will cause a row request. Here, an exemplary pixel 112 in a row 110 is shown with an incident event 114. As described above, pixel 112 will flag 100 with a row request causing a token 116 to be generated. Alternatively, the row arbitration can be continually cyclically sequenced. Token 116 continuously advances through row arbitrator 105 until the token reaches a flagged row 120. After a valid row address is found the row arbitration selects the row for readout using row flag read signal 106. The row readout will flag column request 102, activating a column arbitrator 107. Column arbitrator 107 creates a token 126 which advances through the columns until a valid column address 124 is found and readout. If there are multiple pixels detecting pulses, for instance, if the return pulse spanned multiple pixels, each pixel address would be sequentially readout.

The address arbitrators advance at a rate of about a couple hundred picoseconds per row or column. The timing jitter depends on the scan time of the device, which in turn depends on the pixel array size. If only one pixel is flagged in a 640 by 512 InGaAs array the maximum time to scan the array and locate the flag is about 40 ns. Determination of arrival time can be compensated by the location of the signaling pixel because the digital arbitration is deterministic. For instance if tokens are always sent from one end of the row, or the column, then uncertainty in the arrival time can be adjusted based on the location of the pixel from the end of the column, or the row, allowing for calibrated time stamps. In addition to spatial compensation, various tree and hierarchical decoder and arbitration configurations can also increase readout speed and accuracy as is known in the art.

Determination of pixel addresses detecting return pulses allow for increased functionality of the readout decoder control blocks. If a single readout decoder block is employed then the decoder can track and readout only those pixels which detect events in the address arbitration circuit of the transient signal path. Likewise if a second readout decoder block is employed readout the passive signal path can continue and for those pixels the second readout control block can readout those addresses or limit readout to a region-of-interest around those addressed pixels.

To increase readout speed of the array, the readout decoder control can comprise of a plurality of row decoders and column decoders. For instance the row decoder can be subdivided into four row sub-decoders and the column decoder can be subdivided into four column sub-decoders. Each row and column sub-decoder pair can then service a quadrant of the array. Readout of each quadrant is substantially the same as described above within each pixel area. Subdividing the row and column decoders allows for a reduced arbitration area of about 25% and therefore a decrease in jitter time associated with scanning the entire area. The row and column decoder are preferably located adjacent to the serviced pixel area to allow the shortest electrical path from pixel area to arbitrators. Each of the pixel areas can be readout asynchronous from another. Similarly, the arbitrators or optional second readout decoders can be subdivided for increased readout speed of the addresses or timing circuit of the transient signal path.

Figure 6:
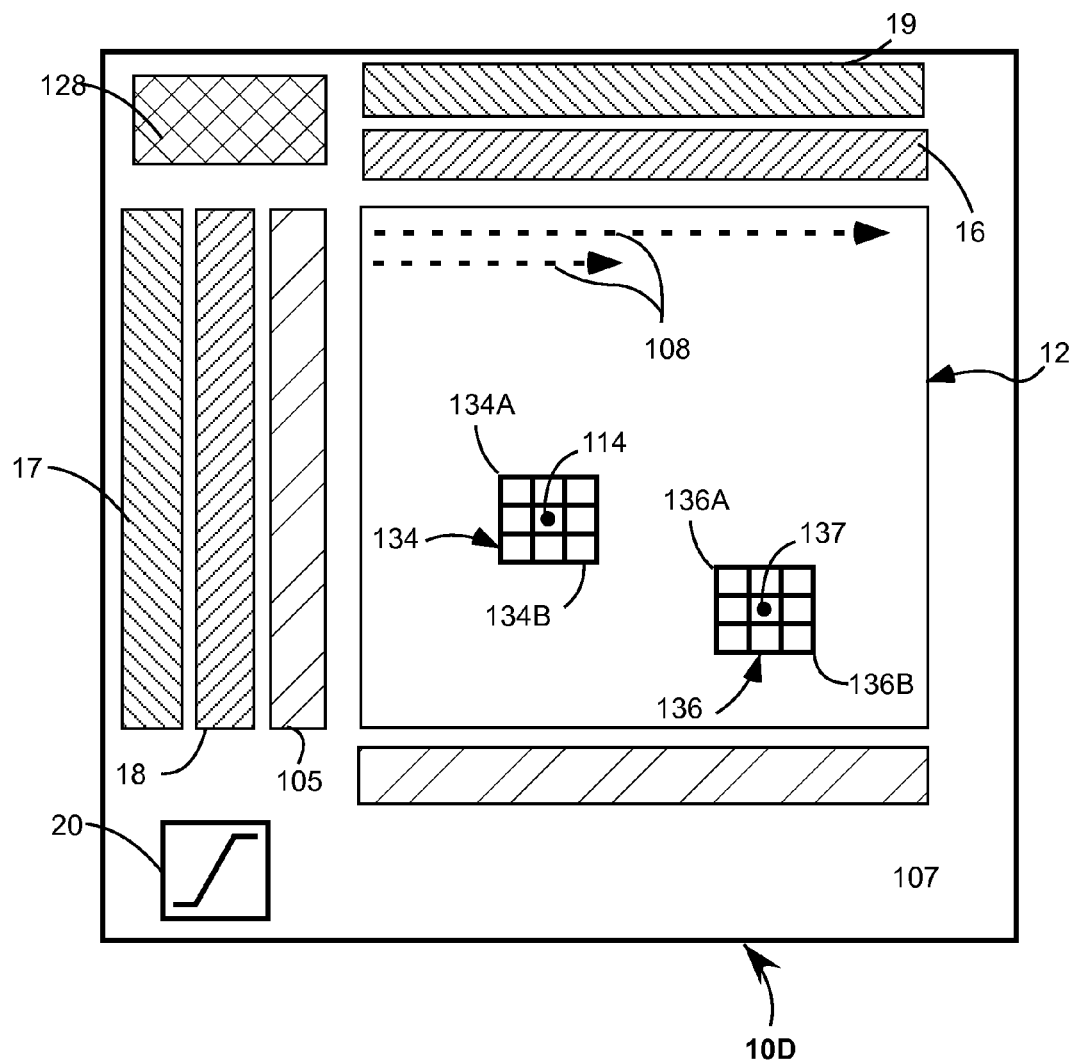
FIG. 6 is a plan view of that shown in FIG. 5, wherein readout of a region-of-interest is exemplified.

FIG. 6 illustrates a device 10D. Device 10D has the same elements as the device shown in FIG. 1 with the addition of a controller 128. Device 10D exemplifies the readout of pixels in the region-of-interest. Here, pixels in a pixel-area 134 and a pixel-area 136 are exemplified for explanatory purposes. Addition of controller 128 allows advanced functionality of the device such as faster passive framing, from either the first or optional second readout control block, in certain regions of the pixel array by reading out the passive image in only a subset of the pixels. For instance, if a return pulse 135 is detected within one of the pixels in a pixel area 134, then controller 128 can modify a passive control logic 130 such that the start and stop pixels in the raster are a pixel 134A and 134B, respectively. Pixels 134A defines a start row/column start boundary and pixel 134B define a row/column stop boundary. This reduced area or region-of-interest can be read out at a faster frame rates since there are less pixels to readout. If, for instance, the time readout decoder block were reading out pixel-area 134, the passive image would continue to readout from the whole array and the address decoder block would continue to asynchronously detect pixels detecting pulses. For instance if another transient event 137 was detected by the address arbitration control block at another pixel area 136, then a second region-of-interest could optionally read out with a raster start and stop pixels 136A and 136B, respectively.

The controller is either on-chip logic which can be integrated within the device circuitry or manufactured separate from, but be in communication with the device. The controller can be characterized as a digital integrated circuit, microprocessor, microcontroller, processor, or digital signal processor. The controller can be fixed or field programmable. The controller also allows logical coupling with other optic devices. For example, the laser or laser designator operation can be coupled with the device with the controller. Additionally the controller can disable operation or readout of pixels. Pixel disable logic is desirable when noisy pixels provide erroneous data in the passive signal path or false triggers in the transient signal path.

In addition to controlling the region-of-interest, the integration time of the passive path can be modified, or the analog-time-signature can be modified. For instance the integration time of the passive signal paths can be stopped early or started later for shortened integration times. This technique can be useful when imaging through semi-transparent media and obscurations. For instance obscurations such as rain, clouds, fog, smoke, dust, and certain glasses can saturate the passive imager during integration periods. Illuminating the area with wavelengths transparent or semi-transparent to such obscurations, yet still detectable by the photodetector material, allow imaging through the obscurations. By shortening the integration time, less of the unwanted background noise from the obscurations will be detected and with sufficient illumination, objects and scene data imagery can be obtained. In addition, ranging information which identifies objects through the obscurations can provide feedback for the controller to adjust the integration time based on the distance to the target and illumination.

In either of the aforementioned configurations and methods, implementation of a more accurate discriminator circuit will reduce range-walk error of return signals. Range-walk error is the error associated with signals of various amplitude. FIG. 7A and FIG. 7B are two possible circuits which can be employed in the discriminator circuit shown in FIG. 2 to reduce range walk error. When using a simple threshold discriminator, pulses of different amplitudes trigger at different positions of the rising edge which lead to time-of-arrival errors. For example, a larger signal may trigger before a smaller signal in a simple threshold discriminator since the rising edge approaches the threshold voltage sooner than a smaller signal.

FIG. 7A is an example of a constant fraction discriminator (CFD). The CFD circuit triggers based on the constant fraction of the total peak height. This allows triggering independent from the peak amplitude thereby giving more accurate timing and reducing range walk. The pulse signal enters the CFD circuit at a node 140. If the pulse voltage is greater than a threshold 143, then a leading edge discriminator 142 will trigger. The signal also enters an attenuator 144 in parallel with both a signal delay 146 and an inverting amplifier 148. Both the attenuated signal and inverted signal are input to a summation block 150 such that a constant bipolar signal is produced regardless of the amplitude of the original pulse. The bipolar signal is gated with the output of discriminator 142 in a logic block 152.

FIG. 7B is an example of a zero cross discriminator D2. The zero cross discriminator has leading edge discriminator 142 will trigger as long as the signal is over threshold 143, similar to that shown in FIG. 7A. In parallel, a first amplifier 156 differentiates the charge accumulated by the signal, and then a second differentiator 158 takes the second derivative. The second derivative provides a zero crossing corresponding with the peak of the original pulse. The zero crossing signal is gated with the output of discriminator 142 in a logic block 160.

Figure 8A:
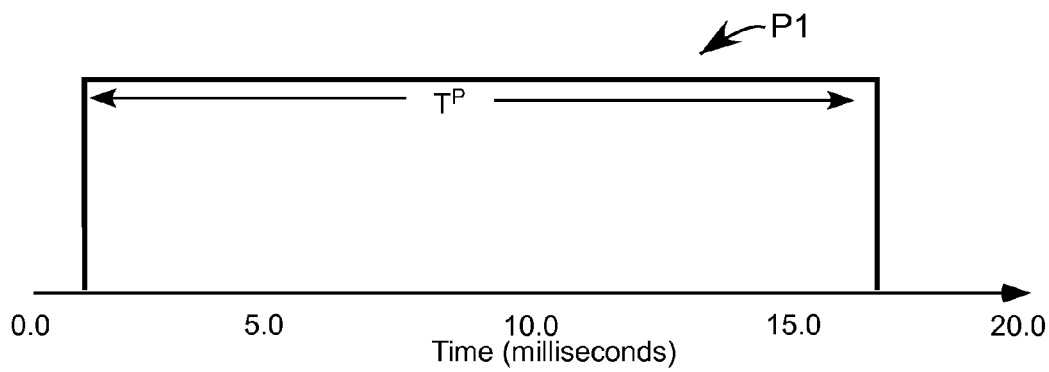
FIG. 8A is a temporal diagram of a passive frame
Figure 8B:
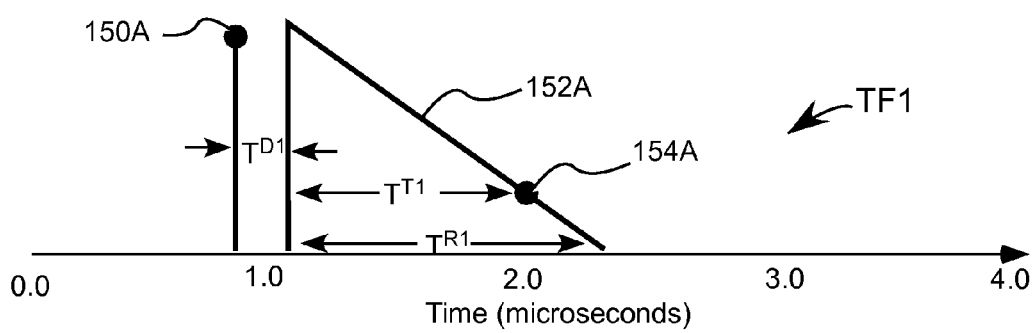
FIG. 8B is a temporal diagram of a transient frame operation.
Figure 8C:
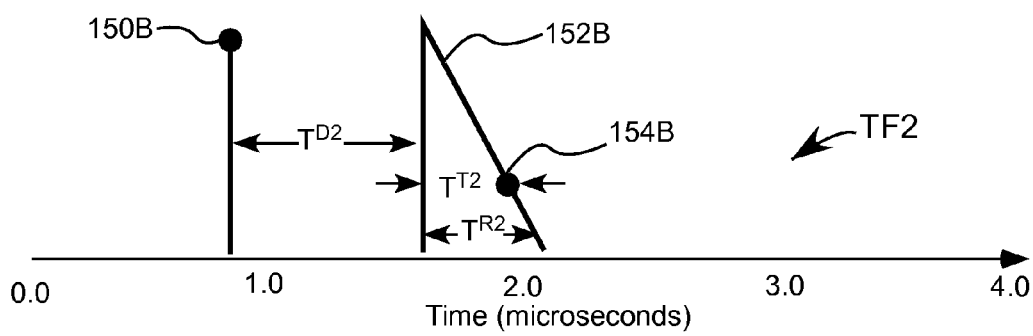
FIG. 8C is a temporal diagram of a second transient frame, optimized for detection of an object detected in the transient frame of FIG. 8B.

FIG. 8A, FIG. 8B, and FIG. 8C are temporal profiles demonstrating operation of the passive signal and transient signal path operation when readout using a single readout decoder block and further exemplifying range-gating during passive readout. FIG. 8A shows a passive path profile P1 demonstrating the time period for readout of the passive path. A passive signal integration time $T^P$ is shown with a duration in the milliseconds which is typical of larger arrays when reading out at Megahertz speeds. The timing of the passive path is exemplary only, the readout of which depends on optical flux, the size of the array and required integration time.

FIG. 8B illustrates events in a transient frame TF1. The transient path events can occur simultaneous with the passive signal path integration or readout. The events are shown in the microsecond scale which corresponds with the time-of-flight. For instance the time-of-flight of an electromagnetic pulse traveling 300 meters has a time-of-flight lasting 1 microsecond, the distance to the object, from the device, being 150 meters. A pulse 150A acts as the time-base reference for the return signal. The time-base reference can be determined known emission time of the electromagnetic source or alternatively a dedicated on-chip photodetector, pixel in the array, or feedback photodetector can provide the time-base reference by detecting the pulse emission via a pickoff scheme. The time-to-analog circuit starts a analog-time-signature 152A after a delay $T^{D1}$, the delay based on expected distance to an object, although a delay is not required. Here, analog-time-signature profile is a decreasing ramp with a duration $T^R$. The duration of the analog-time-signature, along with the delay from its start, allows the detector be sensitive to a particular bounded range or gated-range, described earlier, and more generally as range-gating. The transient path detects the return pulse after a return time $T^{R1}$ and a ramp value 154A is stored on the time-hold capacitor. The time-of-flight is the sum of delay $T^{D1}$ and ramp time $T^{R1}$, the ramp time deduced from the ramp value. As aforementioned the time-hold capacitor holds the value until readout of the transient path.

FIG. 8C illustrates events in a second transient frame TF2. Here the distance to the object is known based on the previous transient signal path readout. In order to receive more accurate ranging information the time-to-analog circuit generates steeper ramp for an analog-time-signature 152B. Analog-time-signature 152B has a duration $T^{R2}$ shorter than the previous ramp, therefore requiring a longer delay $T^{D2}$ from the time-base reference 150B in order to detect the object. The steeper analog-time-signature results in improved temporal resolution.

Figure 8D:
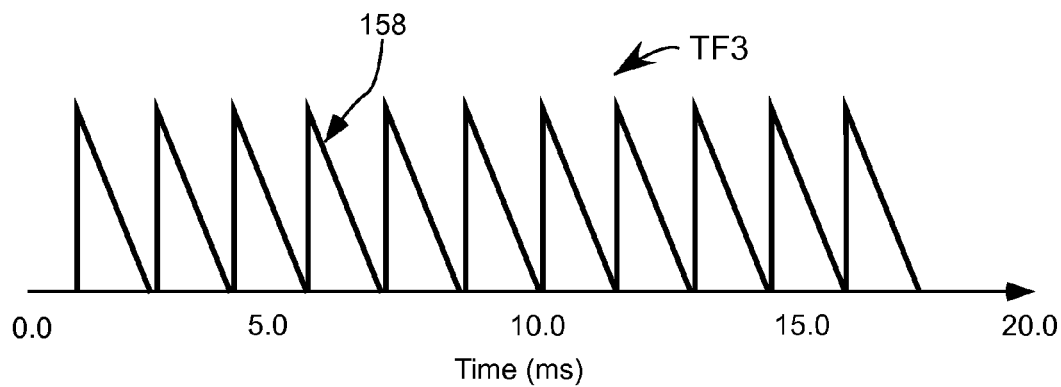
FIG. 8D is a temporal diagram illustrating the transient readout when a second readout decoder block is provided for the transient path.
Figure 8E:
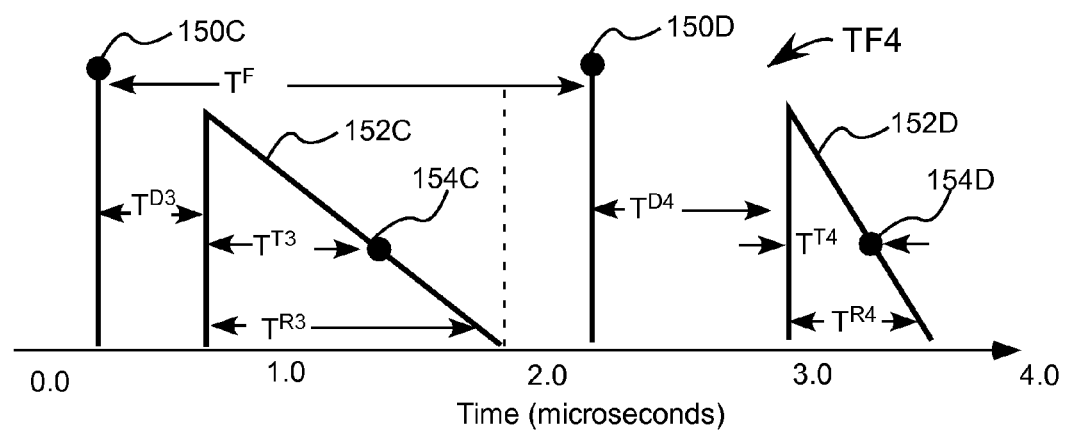
FIG. 8E is detail of the transient frame operation as that shown in FIG. 8D.

FIG. 8D and FIG. 8E are temporal profiles demonstrating the transient signal path operation when the second readout decoder block and address arbitration control block are implemented. FIG. 8D illustrates events in transient frame TF3. Here the timescale is in milliseconds corresponding to the passive path readout time frame of that shown in FIG. 8A. As a second readout decoder block is implemented, multiple transient signal path readouts, represented by analog-time-signature series 158, may be performed while the passive image of the array is readout.

FIG. 8E illustrates events in a transient frame TF4. Transient frame TF4 demonstrates operational detail of transient path of that shown in FIG. 8D, wherein the timescale in microseconds. The first pulse and corresponding analog-time-signature is substantially similar to that described in FIG. 150A. Pulse 150C acts as the time-base reference for the return signal as previously described. The time-to-analog circuit starts an analog-time-signature 152C after a delay $T^{D3}$, the delay based on expected distance to an object and the desired range to be detected, although a delay is not required. Here, analog-time-signature profile is a decreasing ramp with a duration $T^{R3}$. The transient path detects the return pulse after a return time $T^{T3}$ and a ramp value 154C is stored on the time-hold capacitor. The time-of-flight is the sum of delay $T^{D3}$ and return time $T^{T3}$, the ramp time deduced from the ramp value, as before. Here, readout can be performed at a high speed allowing multiple pulses to be sent and detected asynchronous within the passive signal path operation.

A second pulse and a corresponding time-base reference 150D is emitted at a time $T^F$, corresponding with the frequency of emission of the electromagnetic source. Here, time-base reference 150D is after the end of analog-time-signature 152C, but in practice the pulse could be emitted within ramp duration $T^{R3}$, dependent on the distance to objects to be detected. In order to receive more accurate ranging information the time-to-analog circuit generates steeper ramp for a analog-time-signature 152D, based on the distance determined from the previous readout. Analog-time-signature 152D has a duration $T^{R4}$ shorter than the previous ramp, therefore requiring a longer delay $T^{D4}$ from the time-base reference 150D in order to detect the object.

Figure 9A:
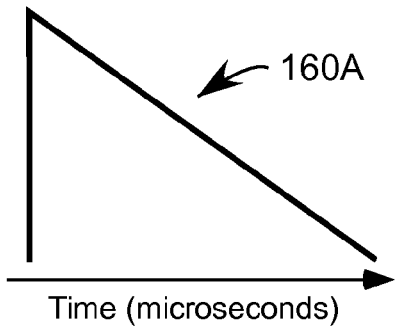
FIG. 9A, FIG. 9B, FIG. 9 C, and FIG. 9D are temporal profiles of various analog-time-signatures.
Figure 9B:
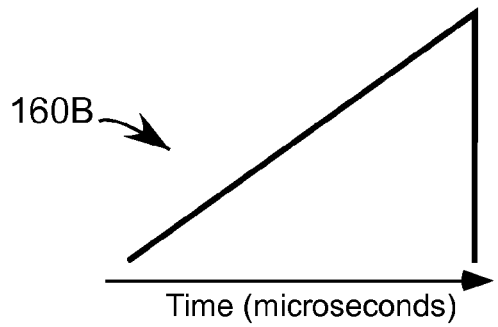
Figure 9C:
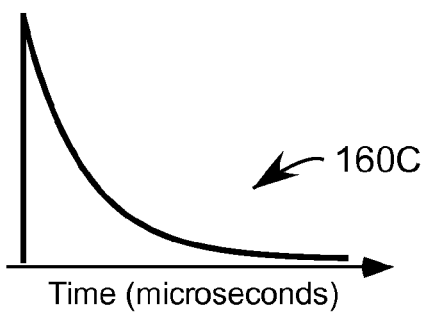
FIG. 9E is temporal profiles of an oscillating analog-time-signatures for use in conjunction with a digital timing circuit.
Figure 9D:
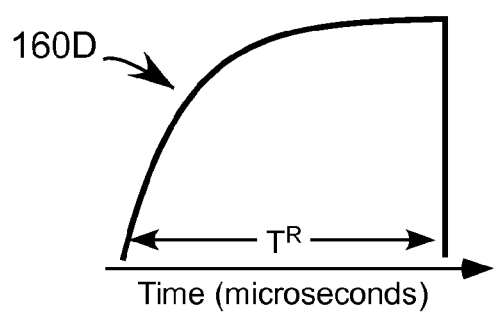

The analog-time-signature can be delayed, the duration changed, and the profile modified. FIG. 9A, FIG. 9B, FIG. 9C, FIG. 9D, and FIG. 9E are nonlimiting examples of various analog-time signature profiles. FIG. 9A illustrates a analog-time-signature 160A, a decreasing linear ramp. FIG. 9B illustrates an analog-time-signature 160B, an increasing linear ramp. FIG. 9C illustrates a analog-time-signature 9C, an exponentially decreasing function. FIG. 9D illustrates a analog-time-signature 9D, an exponentially increasing ramp. Any nonlinear function can be corrected with appropriate correction factors.

Figure 9E:
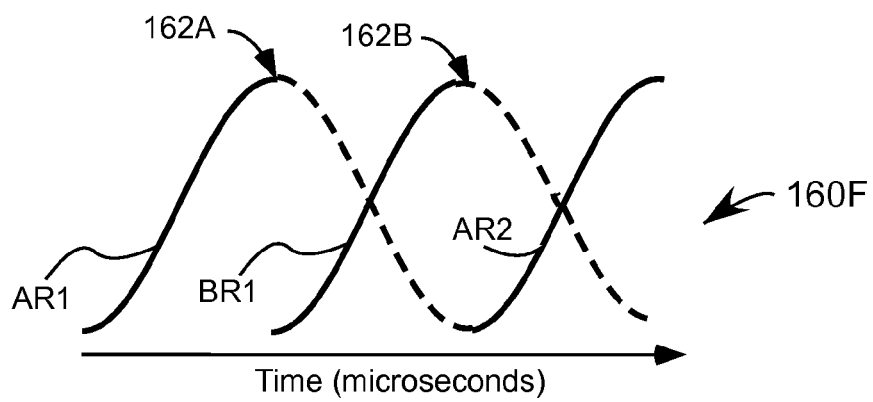

FIG. 9E illustrates analog-time-signature 160F. An analog-time-signature 160F has an oscillating signal 162A and an oscillating signal 162D, each out of phase with another by 90 degrees so there is always a rising or falling edge, signified by AR1 and AR3, respectively, of oscillating signal 162A and a rising edge BR1 of oscillating signal 162B. With the addition of a digital counter the value of the rising edges can be used as to determine the time-of-flight of return pulses. The digital counter can track the number of rising edges which pass thereby tracking the time passed. As before, the nonlinear functions can be corrected.

The disclosed imaging device has a variety of useful application. In general it can be used in any imaging application in which passive and LADAR imagery is useful. Specific applications include imaging of flash LADAR, general rangefinding, autonomous vehicle, security, detection of friendly and hostile target designator presence. The passive and active image can be displayed on a monitor, overlapping the data from each symbolically or graphically.

From the description of the present disclosure provided herein one skilled in the art can design the imaging devices in accordance with the present invention. For instance one skilled in the art could use SPICE software to simulate and verify designed circuitry. Other design software and chip layout with software is available from a variety of suppliers such as Cadence Design Systems, Tanner EDA, Silvaco, Inc., Synopsys, Inc., and Mentor Graphics Corp. Coordination of design and fabrication can be accomplished at any commercial semiconductor integrated circuit fab, integrated device manufacturers, or pure-play semiconductor foundries.

While the present invention has been described in terms of particular photodetector materials, circuitry, and operational logic, others can be implemented without departing from the invention. In summary, the present invention is described above in terms of particular embodiments. The invention, however, is not limited to the embodiments described and depicted herein. Rather, the invention is limited only by the claims appended hereto.

What is claimed is:

1. A dual mode imaging device, the device comprising:
a pixelated array of semiconductor detector elements, wherein each pixel of the array has an integrated circuit, the integrated circuits comprising of a passive signal path and a transient signal path, wherein the active signal path triggers readout upon transient event detection;
a timing circuit electrically connected to the transient path, the timing circuit for determining the time-of-flight of pulses emitted from an electromagnetic source; and
wherein the passive path and transient path operate simultaneously, and wherein transient event detection initiates the identification of the location of, and readout of, the signaling transient signal path.

2. The device of claim 1, wherein the pixelated array is made from a material from the group consisting of indium gallium arsenide (InGaAs), silicon (Si), mercury cadmium telluride (HgCdTe), Indium Antimony (InSb), a group III-V, II-VI super lattice, or quantum well detector, or any combinations thereof.

3. The device of claim 1, wherein the electromagnetic source is a laser, the laser wavelength peak within the spectral range from about 180 nanometers (nm) to about 15 micrometers (µm).

4. The device of claim 1, wherein the pixelated array is made from silicon.

5. The device of claim 4, wherein the device circuits and detector elements are made within the same substrate.

6. The device of claim 1, wherein each of the pixels has a dedicated time-to-analog converter.

7. The device of claim 1, wherein the pixelated array is thinned to less than 500 microns thickness and optical radiation enters the device from the side opposite from that containing circuits.

8. The device of claim 1, wherein the device provides gain to the optical signal through an impact ionization process within the detector material.

9. The device of claim 1, wherein the circuits of the device are fabricated using CMOS processing.

10. The device of claim 1, wherein the circuits of the device are fabricated in separate wafers and electrically connected.

11. The device of claim 1, wherein the gain-bandwidth properties of the passive signal paths is adjustable, individually or in aggregate.

12. The device of claim 1, wherein the transient signal path includes a circuit, such as a constant fraction discriminator, for correcting variations in event timing resulting from variations in signal amplitude.

13. The device of claim 1, wherein the detector is sensitive to electromagnetic radiation regions from the group consisting the x-ray, ultraviolet, visible, near-infrared, short infrared, mid-infrared, long infrared, or combinations thereof including laser-lines within those regions.

14. The device of claim 1, wherein the timing circuit includes a time-to-analog generator, the time-to-analog generator providing an analog-time-signature.

15. The device of claim 14, wherein the analog-time-signature is a linear temporal function.

16. The device of claim 14, wherein the timing circuit modifies the analog-time-signature start, profile, duration or combination thereof based on the distance to objects.

17. The device of claim 16, wherein the time-to-analog converter delays the start of the analog-time-signature and shortens the duration of the analog-time-signature such that range data is more accurate.

18. The device of claim 16, wherein the time-to-analog converter delays the start of the analog-time signature and alters the duration of the analog-time-signature to allow range-gating.

19. The device of claim 1, wherein the passive paths and the transient paths are operated by a shared readout decoder block.

20. The device of claim 1, wherein the transient signal paths of pixels are readout only if a return signal is detected.

21. The device of claim 1, wherein the readout decoder block comprises of a plurality of sub-decoders, the sub-decoders electrically connected to sub-sections of the pixel array, the sub-decoders reading out through separate outputs from the other sub-sections of the array such that the time required to readout signals is decreased.

22. The device of claim 1, wherein the transient signal path circuitry include digital flag readout circuitry, the digital flag circuitry operated by an address arbitration control block.

23. The device of claim 22, wherein the operation of the row or column arbitration circuit logic is initiated by detection of an event in the transient channel of one or more of the pixels in the array.

24. The device of claim 22, wherein the address arbitration control block reads out transient path signals based on a multi-level hierarchy of processing elements such that processing of signals occurs faster.

25. The device of claim 22, wherein the address arbitration control block is comprised of a plurality of independent asynchronous sub-arbitrators electrically connected to different portions of the pixel array for the purpose of reducing the time required to determine address locations of pixels detecting events.

26. The device of claim 22, wherein the logic of the row or column arbitration circuits is sequenced continually while the device is imaging.

27. The device of claim 22, wherein one or more pixel elements are readout from the passive path signal based on the address of events detected in the address arbitration control.

28. The device of claim 1, the device further comprising of a reference photodetector, the reference photodetector providing a time-base reference of electromagnetic pulses.

29. The device of claim 1, wherein the transient path detection threshold level is adjustable.

30. The device of claim 29, wherein the detection threshold level is adjusted based on the distance to objects in the field-of-view of the device.

31. The device of claim 1, wherein the imaging device further comprises a controller.

32. The device of claim 31, wherein the data from both the transient paths and the passive paths are used to track a target emitting or reflecting electromagnetic radiation.

33. The device of claim 31, where in the controller allows a plurality of programmable operating modes, the modes determining the row and column origin and end readout of pixels in either the passive or transient signal path.

34. The device of claim 31, wherein one or more symbols are superimposed at one or more addresses of a display of the passive path information, wherein the symbols correspond to the range deduced for objects detected in the respective active path at that address.

* * * * *